United States Patent
Racz

(10) Patent No.: US 6,348,636 B1
(45) Date of Patent: Feb. 19, 2002

(54) PURIFICATION OF POLYMERIC DISPERSIONS BY STRIPPING IN THE PRESENCE OF ADSORBENT MATERIALS

(75) Inventor: Robert Racz, Charlotte, NC (US)

(73) Assignee: le;.5qBASF Corporation, Southfield, MI (US)

( * ) Notice: Subject to any disclaimer, the term of this patent is extended or adjusted under 35 U.S.C. 154(b) by 0 days.

(21) Appl. No.: 09/467,782

(22) Filed: Dec. 20, 1999

(51) Int. Cl.[7] .............................. C07C 7/12; C08F 6/00
(52) U.S. Cl. ..................... 585/820; 585/825; 585/826; 585/827; 585/829; 585/830; 585/831; 528/500
(58) Field of Search ................................ 585/820, 825, 585/826, 827, 829, 830, 831; 528/500

(56) References Cited

U.S. PATENT DOCUMENTS

| | | |
|---|---|---|
| 2,016,102 A | 10/1935 | Breuers |
| 2,140,198 A | 12/1938 | Benzing et al. |
| 2,433,060 A | 12/1947 | Ohsol et al. |
| 2,475,053 A | 7/1949 | Rumbold |
| 2,484,425 A | 10/1949 | Rumbold |
| 2,510,370 A | 6/1950 | Bixby |
| 2,514,207 A | 7/1950 | Johnson |
| 2,615,010 A | 10/1952 | Troyan |
| 2,844,568 A | 7/1958 | Mertz |
| 2,862,982 A | 12/1958 | Cull et al. |
| 2,927,065 A | 3/1960 | Gerlicher et al. |
| 2,977,346 A | 3/1961 | Cull et al. |
| 3,246,050 A | 4/1966 | Zweigle |
| 3,505,263 A | 4/1970 | Roth |
| 3,527,741 A | 9/1970 | Hattori et al. |
| 3,590,026 A | 6/1971 | Carlson et al. |
| 3,640,978 A | 2/1972 | Baba |
| 3,684,783 A | 8/1972 | Lauck |
| 3,944,513 A | 3/1976 | Greenwald et al. |
| 4,061,780 A | 12/1977 | Yoshida et al. |
| 4,182,854 A | 1/1980 | Hozumi et al. |
| 4,302,576 A | 11/1981 | Nash |
| 4,406,750 A | 9/1983 | Irvin |
| 4,408,039 A | 10/1983 | Irvin |
| 4,418,191 A | 11/1983 | Irvin |
| 4,504,654 A | 3/1985 | Duffy |
| 4,864,012 A | 9/1989 | Britt |
| 4,906,329 A | 3/1990 | Tominari et al. |
| 5,322,927 A | 6/1994 | Ramachandran et al. |
| 5,414,193 A | 5/1995 | Taylor et al. |
| 5,430,127 A | 7/1995 | Kelly |
| 5,442,040 A | 8/1995 | Ou |
| 5,516,818 A | 5/1996 | Chen et al. |
| 5,531,866 A | 7/1996 | Pathak et al. |
| 5,545,296 A | 8/1996 | Pathak et al. |
| 5,575,894 A | 11/1996 | Foral |
| 5,580,426 A | 12/1996 | Ganeshan |
| 5,614,100 A | 3/1997 | Gallup |
| 5,618,333 A | 4/1997 | Buchholz, Jr. et al. |
| 5,622,641 A | 4/1997 | Kim et al. |
| 5,646,225 A | 7/1997 | Guo |
| 5,656,178 A | 8/1997 | Marchesi et al. |
| 5,717,031 A | 2/1998 | Degen et al. |
| 5,728,185 A | 3/1998 | Buchholz, Jr. et al. |
| 5,728,777 A | 3/1998 | Guo |
| 5,733,417 A | 3/1998 | Foral |
| 5,753,009 A | 5/1998 | Sirkar et al. |
| 5,753,122 A | 5/1998 | Taylor et al. |
| 5,753,742 A | 5/1998 | Bumanlag |
| 5,770,303 A | 6/1998 | Weinert et al. |
| 5,779,768 A | 7/1998 | Anand et al. |
| 5,811,607 A | 9/1998 | Richardt et al. |
| 5,814,514 A | 9/1998 | Steffan et al. |
| 5,817,722 A | 10/1998 | Yezrielev et al. |
| 5,907,066 A | 5/1999 | Wachs |
| 5,919,874 A | 7/1999 | Guo |
| 5,928,409 A | 7/1999 | Sirkar |

*Primary Examiner*—Walter D. Griffin
*Assistant Examiner*—Tam M. Nguyen

(57) ABSTRACT

The present invention relates to methods for removing VOCs from an aqueous polymer dispersion (e.g., an SBR latex) in which the dispersion is contacted with a stripping medium in the presence of a particulate adsorbent such as activated carbon. This process results in the rapid and economical removal of VOCs from polymer dispersions.

20 Claims, 2 Drawing Sheets

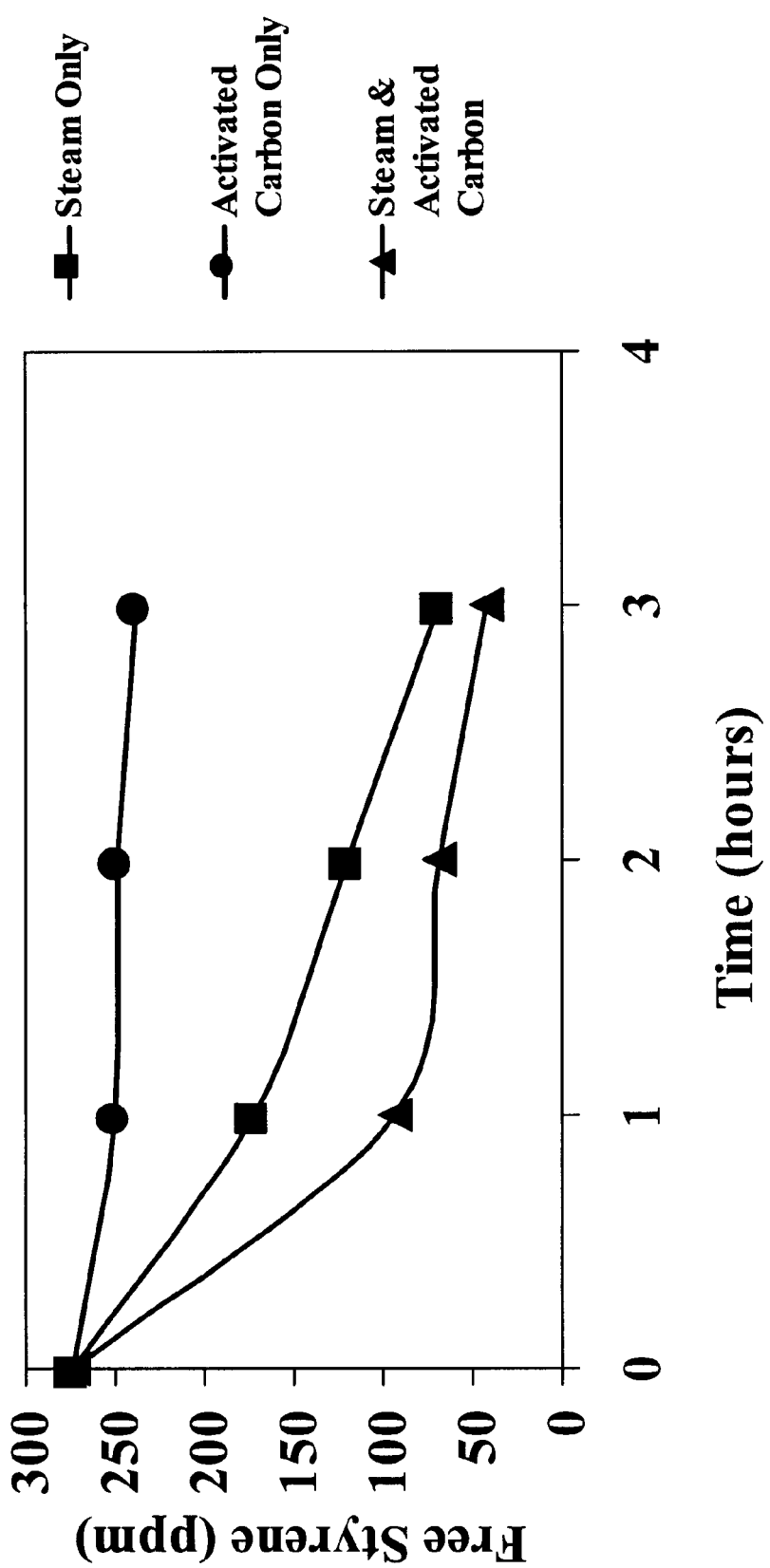

US 6,348,636 B1

PURIFICATION OF POLYMERIC DISPERSIONS BY STRIPPING IN THE PRESENCE OF ADSORBENT MATERIALS

BACKGROUND OF THE INVENTION

1. Field of the Invention

The present invention relates to methods for removing volatile organic material from an aqueous dispersion of a synthetic polymer. In particular, it relates to the removal of volatile organic contaminants (VOCs) from latex dispersions.

2. Description of Related Art

In the polymerization of organic monomers in an aqueous medium to form a dispersion of polymer in water, the resultant dispersion typically contains residual organic impurities which result from incomplete conversion of monomers, impurities in raw materials and undesirable by-products formed during the polymerization reaction. For example, in a styrene-butadiene aqueous emulsion polymer, these impurities can include: unreacted styrene and butadiene; ethyl benzene, an impurity in the styrene; 4-vinyl cyclohexene (VCH), an impurity in the butadiene; 4-phenyl cyclohexene (PCH), a by-product of the polymerization.

Conventionally, organic volatiles have been removed from an aqueous polymer dispersion made by emulsion or suspension polymerization by a process known as steam or inert gas stripping. In this process the dispersion is contacted with steam, air or an inert gas (e.g., nitrogen) at either reduced or elevated temperatures and pressures. This process can be carried out in a variety of different types of equipment, for example, columns, semibatch strippers, thin film evaporators and plate evaporators. However, because of the strong interaction between the organic volatiles and the polymer, to achieve a low level of volatiles in the dispersion requires high ratios of stripping medium/dispersion. To generate this stripping medium requires the use of large amounts of energy and results in high energy costs.

Another method which has been used for removing VOCs from natural and synthetic polymeric dispersions involves contacting the dispersion with an adsorbent material, such as carbon black, activated charcoal, silica gel, aluminum oxide and ferric oxide. A similar method is known for purifying various polymer resins wherein the polymer is first dissolved in a solvent and the resulting solution is contacted with alumino-silicates. Some prior art processes for decolorizing or deodorizing polymeric materials have suggested that stripping and adsorbent treatment could be used alternatively or even serially.

None of the prior art processes for purification of aqueous polymeric dispersions has been able to provide extremely low residual VOC levels under conditions that are both effective and economical.

SUMMARY OF THE INVENTION

The present invention overcomes the problems and disadvantages associated with current strategies and designs in purification of polymer dispersions.

The present invention relates to a process for removing VOCs from a polymer dispersion which process, in the preferred embodiment, comprises steam, air or inert gas-stripping the dispersion in the presence of a particulate adsorbent. This process can be employed to purify any polymeric dispersion, emulsion, suspension or solution and is particularly useful in the removal of VOCs from aqueous polymeric latices such as those based on styrene butadiene polymers or acrylic polymers. This process provides for the rapid and economical removal of VOCs. The process of this invention can result in achieving lower residual VOC levels than the prior art methods employing either steam stripping or particulate adsorbent treatment and can be employed to achieve similar VOC levels at lower energy costs than prior art methods. In one embodiment of the process of this invention, a slurry of adsorbent particles in the polymer dispersion is subjected to steam stripping, followed by separating the adsorbent particles from the purified latex dispersion. In another embodiment of this invention, the adsorbent particles are retained in the stripping vessel in the form of a fixed or fluidized bed or otherwise immobilized in said stripping vessel. In yet another embodiment, discrete quantities of the particulate adsorbent material are provided in latex permeable flow-through enclosures (e.g., in a manner analogous to teabags). These adsorbent-containing enclosures can be added to the stripping vessel separately or with the latex feed. Such an arrangement greatly facilitates the separation of spent adsorbents from the purified polymeric stream. If desired, both the stripping media and the adsorbent can be further processed to regenerate the reagents and recover valuable VOCs such as residual monomers.

Other objects, advantages and embodiments of the invention are set forth in part in the description which follows, and in part, will be obvious from this description, or may be learned from the practice of the invention.

BRIEF DESCRIPTION OF THE DRAWINGS

FIG. 2 is a graph showing the level of volatile monomer removal by steam stripping alone, cold adsorbent contact alone, and using an embodiment of the present invention employing steam stripping in the presence of adsorbent particles in a flow-through enclosure.

DETAILED DESCRIPTION OF PREFERRED EMBODIMENTS

Figure 1:
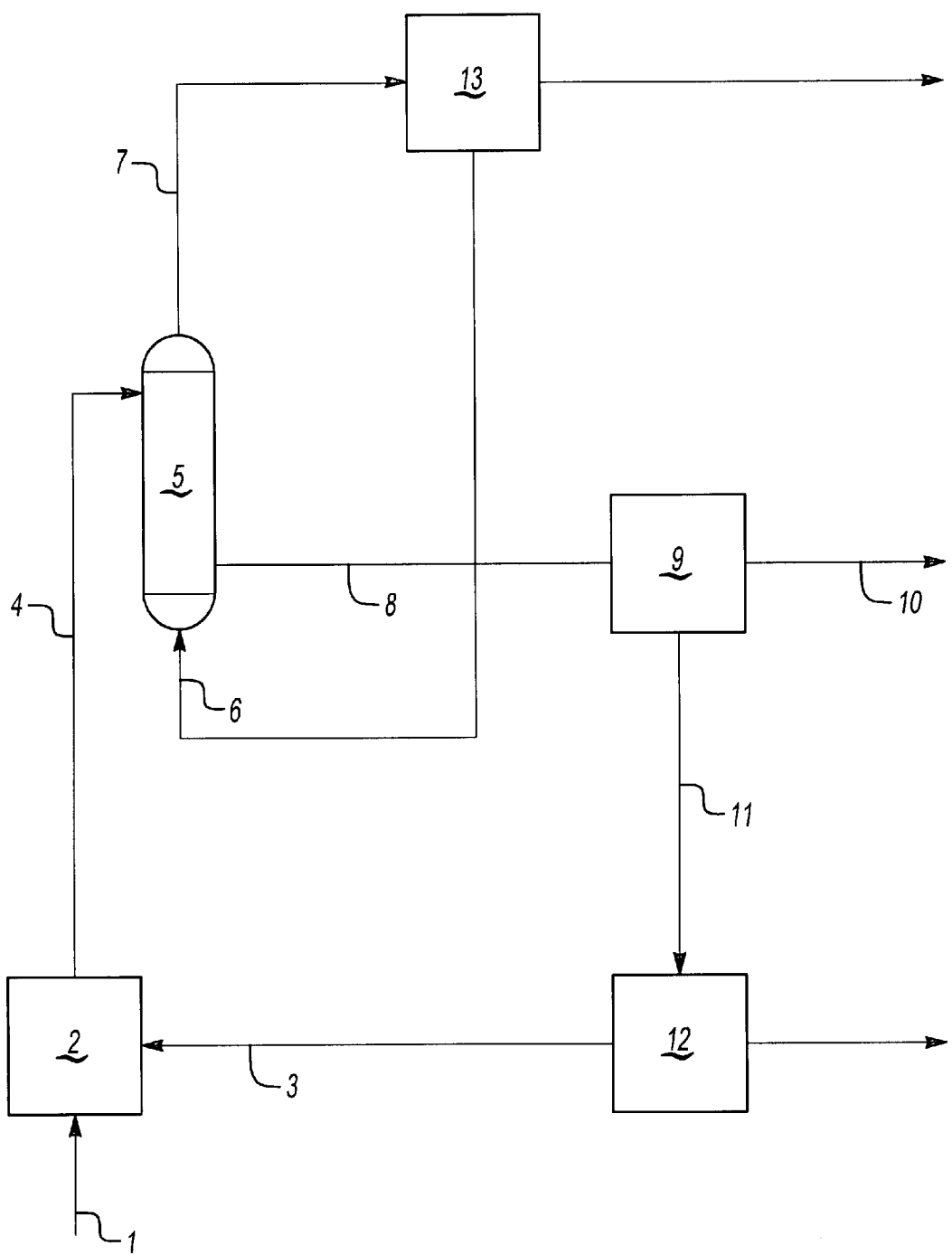
FIG. 1 is a process flow diagram illustrating one embodiment of the process of the present invention.

The process of the present invention can be used to remove volatile organic contaminants (VOCs) from polymeric dispersions, emulsions, or suspensions and, in particular, any stable aqueous dispersion of a water insoluble polymer. Among suitable polymers are those prepared from monomers comprising at least one of the following groups:

| | |
|---|---|
| vinylidene | $CH_2=C<$, |
| vinyl | $CH_2=CH-$, and |
| vinylene | $-CH=CH-$, | whether homopolymerizable or not. Examples are the $\alpha,\beta$-ethylenically unsaturated monocarboxylic acids and esters and amides thereof, $\alpha,\beta$-ethylenically unsaturated aldehydes, $\alpha,\beta$-ethylenically unsaturated dicarboxylic acids and esters, amides, half esters, and half amides thereof, $\alpha,\beta$-ethylenically unsaturated nitriles, hydrocarbons such as $\alpha$-olefins, conjugated diolefins, vinylaryl compounds, vinyl alkyl ethers, vinyl halides, vinylidene halides, vinyl sulfides, vinyl acyloxy compounds (esters of saturated carboxylic acids and ethylenically unsaturated alkanols), vinyl amines and salts thereof, vinyl ureido monomers, vinyl compounds having heterocyclic nitrogen-containing (HN<) groups, and halogen, hydroxyalkyl, or aminoalkyl substituted derivatives thereof, whether homopolymers or copolymers. The aqueous dispersions of these polymers and methods for their preparation form no part of the present invention, and any such polymer may be treated in accordance with the present invention. Mixtures of different polymer dispersions are useful, as are aqueous dispersions prepared by first polymerizing in solution or suspension in an organic solvent, then dispersing the material in an aqueous medium.

Specific examples of suitable monomers which may be homopolymerized or copolymerized to obtain water insoluble polymers for treatment according to the invention are acrylic acid, methacrylic acid, itaconic acid, maleic acid, phthalic acid, esters and half esters thereof with alkanols having 1 to 20 carbon atoms, such as methanol, ethanol, butanol, pentadecanol and the like, and amides and half amides thereof with ammonia or organic amines, acrolein, methacrolein,, ethylene, propylene, isobutene, butadiene, isoprene, chloroprene, styrene, vinyltoluene, vinyl methyl ether, vinyl isobutyl ether, vinyl chloride, vinyl bromide, vinylidene chloride, vinyl sulfide, vinyl acetate, vinyl propionate, the vinyl pyridines, primary amino compounds such as β-aminoethyl vinyl ether, aminopentyl vinyl ether, secondary amyl t-butyl aminoethyl methacrylate, tertiary amino-containing compounds such as t-dimethylaminoethyl methacrylate, and the allied amine salts such as the chloride or hydroxide, ureido monomers such as are disclosed in U.S. Pat. Nos. 2,881,155; 3,300,429; and 3,356,627, examples being β-ureidoethyl acrylate, β-(N,N'-ethyleneureido) ethyl acid maleate, β-ureidoethyl vinyl ether, N-vinyl-N,N'-ethyleneurea, N-vinyloxyethyl-N,N'-ethyleneurea, N-methacrylamidomethyl-N,N'-ethyleneurea, and N-dimethylaminoethyl-N'vinyl-N,N'-ethyleneurea, β-hydroxymethyl methacrylate, N-hydroxyethylacrylamide, N-methylolacrylamide, and N-(dimethylaminoethyl) acrylamide. Homopolymers, copolymers, and graft, block, or segmented polymers are included. Conventional methods of obtaining the aqueous dispersions are utilized.

The invention will be described hereinafter in terms of one preferred polymer system of the present invention—the styrene butadiene (SBR) latex system. The preferred SBR latex product is a cold polymerized styrene/butadiene containing from about 20–40% styrene produced in a continuous reactor chain (CSTR). This product is advantageously maintained at low cross-linking density by terminating the polymerization reaction at 70–85% monomer conversion.

The polymer systems purified according to the process of the present invention initially contain undesirable amounts of VOCs. The term "VOC" is intended to include any or all volatile organic materials that are desirably removed from these polymer systems. In some polymer systems, the VOCs may comprise mainly unreacted monomers. In other systems, monomer feed contaminates, reaction by-products, catalyst solvents or the like may also be present. In accordance with the customary usage in the particular polymer system art, the term "VOC" may be employed to refer to undesirable residual monomers or art-recognized major impurities or even all volatile materials. In the SBR latex systems of the preferred embodiment, the VOCs typically monitored include either the residual styrene monomers, or to all volatiles, including PCH, VCH and cis- and trans-butene. As is known in the art, VOC levels in any polymer sample can be determined using gas chromatograph (GC) equipment.

Typical VOC (styrene) levels in SBR latex systems of the type described above can be in the range of 25,000 to 50,000 ppm, total VOCs for this same product would be in the range of 27,000 to 55,000 ppm. The process of the present invention can be employed to substantially reduce the VOC levels of a polymer dispersion. While the process of the present invention can be employed to purify polymer dispersions as produced, in the preferred practice, the polymer dispersion to be purified is subjected to a preliminary treatment step designed to reduce the VOCs to levels of about 5000 or less and more preferably to levels of about 2000 ppm or less. This preliminary step, which typically is designed to recover the major portion of residual monomers, can employ any of the known processes such as distillation.

The process of the present invention can be employed to reduce the level of VOCs to below 1000 ppm, more preferably below 500 ppm and most preferably below 100 ppm.

The stripping media employed in the process of the present invention can be any suitable gas or vapor that is effective to remove VOCs from aqueous dispersion environments. Examples of such media include air, steam and nitrogen. Preferred are stripping systems employing steam. Stripping with a gas/vapor stream is a well-known purification step and can be effective under a number of known conditions of pressure and temperature. The present invention contemplates the use of vacuum or atmospheric stripping and at temperatures that may vary according to the particular polymer system employed. For the SBR latex system described above, steam stripping at slight vacuum (e.g., 5–10 psia) is the preferred mode of operation.

The stripping step of the present invention can be carried out in any of the conventionally employed apparatus. This may be either a batch or continuously operating device. The quantity of the stripping medium is dependent on the temperature and pressure of the system, on the type of volatile to be removed, on the initial concentration of that volatile in the dispersion and the desired final level. For the preferred SBR system of this invention, ratios of steam to latex should generally be in the range of from about 0.1 to about 1.0, and preferably about 0.3 to about 0.5. If the contacting is carried out in a batch process, temperature, pressure, flow rate of stripping medium and time are the controlling process parameters. In a continuous contacting device, temperature, pressure, stripping medium/polymer ratio and equivalent theoretical equilibrium stages are the controlling parameters. For the majority of organic volatiles with the majority of aqueous polymer dispersions, removal of the volatiles is controlled by vapor-liquid equilibrium considerations. The precise process conditions for a specific case can be calculated by the application of known thermodynamic principles and chemical engineering principles of mass transfer/separations processes.

In any steam, gas, or vapor stripping process, the exiting vapors or gases may be purified and reused by contacting the gas or vapors with an adsorbent material or catalyst, further stripping the stripping gas or vapor to remove impurities, a combination thereof, or any other means common to those of skill in the art. See, e.g., U.S. Pat. No. 5,414,193, and U.S. Pat. No. 5,322,927, incorporated by reference in their entirety.

The adsorbent material used in the process of the present invention can be any suitable particulate material that is effective to adsorb VOC in the dispersion environment. Suitable adsorbents include activated carbon, carbon black, activated charcoal, bituminous coals, silica gels, clays, alumina based materials, alumino-silicates, metal oxides and shell based materials. Also, useful are polymeric based materials such as polystyrene cross-linked with divinyl benzene. The preferred adsorbent is activated carbon. One suitable form of activated carbon is Cal 12×40, a granular decolorizing carbon sold by Calgon Carbon Corporation. Other suitable commercially available materials include Sylosiv® A10 (an aluminosilicate zeolite from Grace Davidson) and Dowex® L493 (a polymeric adsorbent from Dow-Chemical).

The adsorbent carbon particles should be of a size that they are separable from the polymer dispersion, whether the carbon is in the form of a fixed bed or a moving bed, or is simply slurried with the polymer and then separated by vacuum or pressure filtering, centrifugal filtering, gravity settling, or centrifugal settling. The carbon should be hard and abrasion resistant. The particles are suitably between about five-sixteenths in. and No. 400 mesh, U.S. Sieve Series, from about No. 5 mesh to about No. 50 mesh being preferred for a carbon bed, and smaller particles than No. 50 mesh being preferred when the slurry method is used. The desired particle size depends somewhat upon the apparent viscosity of the aqueous dispersion; a more viscous product requires the use of larger carbon particles in a bed, because of the pressure drop. The capacity for adsorbed materials, as well as selectivity for given impurities as against materials desirably left in the dispersion such as emulsifiers and dispersants, and as against water are in part dependent upon surface area, pore size, water wettability, total pore volume, and surface polarity or degree of oxidation of the surface. Generally, the physically hard "liquid phase carbons" adapted for aqueous systems which have the desired physical strength, and adsorption capacity, are useful. Suitable materials may have a total surface area of from 750 to 2000 square meters per gram, having three classes of pores in a given particle, large ones greater than about 1000 angstroms in diameter, and medium sized pores between 50 and 1000 angstroms in diameter, which interconnect smaller pores being less than 50 angstroms in diameter. One useful activated or adsorbent carbon is petroleum coke prepared by the destructive distillation of petroleum materials having a similar total surface area, and having a large proportion, 50 to 80%, of the pores in the size range of 10 to 40 angstroms, preferably 20 to 30 angstroms, in diameter. Another type is coconut shell charcoal. Passing a sample of the dispersion at the specified temperature through a laboratory size column of the carbon readily establishes whether or not a given carbon will coagulate the dispersion.

The process of the present invention which comprises stripping a polymeric dispersion in the presence of an adsorbent of the type described above can be carried out in a number of ways. In one preferred embodiment, the adsorbent is added to the polymeric dispersion stream to form a slurry which is then fed to the stripping unit. In this embodiment, the solid adsorbents generally can be advantageously present at levels of from about 1% to about 20% by weight based on polymer solids. Preferably, the solid adsorbent is present at levels of from about 2% to 10% and more preferably the adsorbent is employed at levels in the range of from about 4% to 6%. For the most preferred system employing activated carbon particles and the SBR latex dispersion, about 5% activated carbon is used.

The addition of solid adsorbent particles to the polymer dispersion can take place using any known mixing equipment, including inline mixing, injection mixing or batch mixing in the stripping vessel or in a separate mixing vessel. In the preferred SBR/activated carbon system, the activated carbon can be simply added to the stripping vessel containing the dispersion in a batch type operation, or can be continuously added to the latex stream prior to feeding the slurry stream to a continuous stripping vessel.

In the adsorbent slurry embodiment described above, it will be necessary to separate the spent adsorbent from the purified stripped latex. This can be accomplished in several ways as will be appreciated by those skilled in the art of solids separation. In one preferred embodiment, the spent adsorbents can be separated from the purified stripped latex dispersion after the slurry leaves the stripping zone. Depending on whether the stripping is carried out in batch or continuous mode, the downstream removal of spent adsorbent can be either batchwise or continuous. Conventional separation techniques such as filtration, centrifugal separation, gravity separation, and the like, can be used.

Another embodiment of this invention involves the use of flow-through enclosures containing a plurality of adsorbent particles to facilitate the latex dispersion stripping in the presence of adsorbents. These enclosures, which function somewhat in the manner of teabags, are permeable to the flow of the polymer dispersion and thereby facilitate contact between the latex and the adsorbent, but retain the adsorbent particles in the enclosures. This approach allows for a wider choice of adsorbent materials and particle size or particle size distributions, and facilitate the removal of the spent particulates from the latex dispersion after stripping.

The flow-through enclosure can be made in any suitable size and shape and from any suitable porous material. Non-limiting examples of such materials include porous or mesh-like woven or non-woven fabrics made from natural or synthetic materials such as polyethylene, polypropylene, polyesters, polyamides, cotton, paper and the like. Flexible or rigid materials can also be employed, such as metal cage-like structures. The flow-through enclosures may be fabricated in any shape or size appropriate for mixing into the latex dispersion and which facilitates the contact of the adsorbent with the latex. Suitable examples include a rectangular or square pillow shape, a spherical shape, a cylindrical shape and a cone or pyramid shape. The flow-through enclosure may be permanently sealed or it may be provided with means to permit opening and refilling the enclosure with fresh adsorbent when necessary.

In the embodiment of the process of the present invention employing the flow-through enclosures, the enclosures may be added to the polymeric dispersion prior to the stripping vessel, or the enclosure can be added to the stripping vessel directly. For purposes of separation of the enclosures from the purified stripped dispersion, the enclosures can be retained in the stripping vessel, e.g., by a screen or similar retaining mechanism, or the enclosures can be separated from the purified stripped dispersion downstream of the stripper, e.g., by gravity separation or screening.

Another embodiment of this invention involves the retention of the adsorbent elements in the stripping vessel. In this embodiment, a fixed or fluidized bed of the adsorbent material is provided and retained in the stripping vessel, in a manner known to those skilled in the art of solids/fluid contact.

In an alternative embodiment, the adsorbent material can be immobilized in the stripping vessel by providing a porous coating of the adsorbent material on an appropriate inner surface of the vessel. For example, in a continuous stripping column, trays, downcomer or riser structures can be provided with the adsorbent coating.

In all of the described embodiments, the spent adsorbent can be regenerated with optional recovery of valuable VOC removal from the dispersion (e.g., residual monomers). In the case where the adsorbents are retained in the stripping vessel, it is possible to perform this regeneration in batchwise operations in the stripping vessels.

While not wishing to be bound by any particular theory, applicant believes that the process of the present invention achieve lower VOC levels in treated dispersions than are achieved with either stripping or adsorption alone or even their use sequentially. It is believed that the presence of adsorbent particles during the stripping process achieves this unexpected result by capturing VOCs released into the aqueous phase of the dispersion and therefore shifting the equilibrium for the reversible diffusion of VOCs out of and back into the latex solids. This effect synergistically facilitates the stripping media scrubbing of the VOCs that reach the aqueous phase of the dispersion.

The process of the present invention will now be described in connection with FIG. 1 which shows one embodiment thereof.

Polymer dispersion stream 1 containing the output from an SBR polymerization process is continuously fed to a mixing zone 2, which can be a separate mixing vessel or an inline mixing arrangement. Separately, an appropriate quantity of a particulate adsorbent material, e.g., activated carbon, is supplied to the mixing zone through supply conduit 3. The mixed slurry of SBR latex and activated carbon leaving the mixing zone is fed via conduit 4 to the stripping vessel 5. The stripping media, e.g., steam, is fed to the stripping vessel 5 via conduit 6. In the stripping vessel, the mixed slurry is stripped of VOCs and a first portion of the VOCs are removed by the stripping media, e.g., steam, through gaseous effluent stream 7. The mixed slurry treated in the stripping vessel is continuously removed from the vessel by product slurry line 8. This mixed slurry now contains purified latex dispersion and spent adsorbent particles containing adsorbed therein a second portion of the VOCs. This mixed product slurry is then fed to an adsorbent separation zone 9 where the spent adsorbent particles are removed from the purified latex dispersion. Purified product can be recovered via stream 10, while spent adsorbents can be forwarded via conduit 11 to an adsorbent regeneration zone 12. Regenerated adsorbent from zone 12 can be used as the feed or makeup feed for supplying the mixing zone 3. Optionally, the stripping medium leaving the stripping vessel can be forwarded to a recovery zone 13 where valuable VOCs can be recovered in a known manner and the stripping medium can be regenerated for use in feed stream 6.

The following examples are given to illustrate preferred embodiments of this invention and are not intended to limit the invention in any way. It should be understood that this invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLES

The following examples further describe and demonstrate embodiments within the scope of the present invention. The examples are given solely for the purpose of illustration and are not to be construed as limitations of the present invention, as many variations thereof are possible without departing from the spirit and scope of the invention.

Example 1

To demonstrate the process of the present invention and its advantages, an SBR latex was treated with three separate purification methods: (1) steam stripping, (2) activated carbon adsorption, and (3) according to the present invention, steam stripping in the presence of activated carbon. In all three methods, a batch-type process employing a 2 gallon stirred reactor vessel was employed. In each method 3800 g of SBR latex was added to the vessel. For the activated carbon only treatment, the reactor vessel was stirred at room temperature. In the steam stripping methods, 1200 of excess water was added. The vessel was heated to boiling (60° C.), steam removed and condensed at the rate of 400 g per hr. The vessel was operated at 25–30 in of mercury. Samples of the latex were taken at one hour intervals and analyzed for free styrene content using a GC. The data for all three approaches is set out in Table 1 below.

TABLE 1

| | Free Styrene (ppm) | | |
|---|---|---|---|
| Time | Steam Only | Activated Carbon Only | Stripping with Activated Carbon |
| 0 | 274.2 | 274.2 | 274.2 |
| 1 hour | 172.1 | 249.5 | 93.4 |
| 2 hours | 119.1 | 249.0 | 68.9 |
| 3 hours | 68.1 | 238.6 | 42.3 |

This data is also shown in graphical form on FIG. 2.

The example demonstrates that the process of the present invention not only permits lower styrene levels to be achieved, but also provides for reaching similar reductions in free styrene as those achieved with conventional steam stripping, but in significantly less time (and therefore using less steam/energy).

Example 2

The tests of Example 1 were repeated. Similar results were obtained and are set out in Table 2 below.

TABLE 2

| | Free Styrene (ppm) | | |
|---|---|---|---|
| Time | Steam Only | Activated Carbon Only | Stripping with Activated Carbon |
| 0 | 198.0 | 198.0 | 198.0 |
| 1 hour | 92.2 | 186.2 | 64.2 |
| 2 hours | — | 201.1 | 37.3 |
| 3 hours | 32.1 | 188.4 | 10.9 |

Example 3

The test of Examples 1 and 2 was repeated and data collected for total VOCs. The results were similar and are set out in Table 3 below.

TABLE 3

| | Total VOCs (ppm) | | |
|---|---|---|---|
| Time | Steam Only | Activated Carbon Only | Stripping with Activated Carbon |
| 0 | 1200.0 | 1200.0 | 1200.0 |
| 1 hour | 1290.9 | 1632.9 | 962.3 |
| 2 hours | — | 784.2 | 767.7 |
| 3 hours | 873.9 | 801.6 | 456.2 |

Other embodiments and uses of the invention will be apparent to those skilled in the art from consideration of the specification and practice of the invention disclosed herein. All documents referenced herein are specifically and entirely incorporated by reference. The specification and examples should be considered exemplary only, with the true scope and spirit of the invention being indicated by the following claims. As will be easily understood by those of ordinary skill in the art, variations and modifications of each of the disclosed embodiments can be easily made within the scope of this invention as defined by the following claims.

What is claimed is:

1. A process for removing volatile organic contaminants (VOCs) from an aqueous polymer dispersion comprising contacting said dispersion with a stripping agent selected from the group consisting of steam, a gas and a vapor, said contacting being carried out in the presence of a solid adsorbent.

2. The process of claim 1 wherein said polymer dispersion is a styrene-butadiene latex.

3. The process of claim 1 wherein said stripping agent is steam.

4. The process of claim 1 wherein said contacting is carried out at subatmospheric pressure.

5. The process of claim 1 wherein said VOC comprises a residual monomer.

6. The process of claim 1 wherein said contacting is carried out in a batch process.

7. The process of claim 1 wherein said contacting is carried out in a continuous process.

8. The process of claim 1 wherein said adsorbent is selected from the group consisting of activated carbon, alumina, silica gels and polymeric adsorbents.

9. The process of claim 1 wherein said adsorbent is added to said dispersion prior to said contacting.

10. The process of claim 1 wherein said contacting is carried out in a stripping zone and said adsorbent is added to said stripping zone.

11. The process of claim 10 wherein said adsorbent is retained in said stripping zone.

12. The process of claim 1 wherein said adsorbent is provided in a fixed bed.

13. The process of claim 1 wherein said adsorbent is provided in a fluidized bed.

14. The process of claim 1 wherein said adsorbent is provided in at least one flow-through enclosure that retains a plurality of particulate adsorbents but is permeable to said aqueous polymer dispersion.

15. The process of claim 14 wherein a plurality of said flow-through enclosures are added to said aqueous polymer dispersion prior to said contacting.

16. The process of claim 1 additionally comprising the step of separating said adsorbent from said aqueous polymer dispersion after said contacting.

17. A process for removing volatile organic contaminants (VOCs) from an aqueous dispersion of styrene-butadiene prepared by emulsion polymerization, said process comprising steam stripping said aqueous dispersion in the presence of an activated carbon adsorbent.

18. The process of claim 17 wherein said activated carbon adsorbent is present in the form of flow-through enclosures that retain a plurality of adsorbent particles, said enclosures being permeable to said dispersion.

19. The process of claim 18 wherein said VOCs are present in said aqueous dispersion at a level of about 2000 ppm or less prior to said contact.

20. The process of claim 19 wherein said VOCs are reduced to a level below about 500 ppm by said contacting step.

* * * * *